United States Patent [19]
Bull et al.

[11] Patent Number: 5,562,025
[45] Date of Patent: Oct. 8, 1996

[54] SALAD SPINNER APPARATUS

[75] Inventors: Jeffrey W. Bull, Lombard; Damon A. Johnston, Oswego, both of Ill.

[73] Assignee: Wilton Industries, Inc., Woodridge, Ill.

[21] Appl. No.: 547,974

[22] Filed: Oct. 25, 1995

[51] Int. Cl.$^6$ .......................... A47J 43/04; F26B 17/24; F26B 17/30
[52] U.S. Cl. .................. 99/495; 34/58; 99/511; 210/360.1; 494/60; 494/84
[58] Field of Search .......................... 099/495, 511–513, 099/516, 479, 485; 34/8, 58; 210/360.1, 380.1, 784, 781; 494/11, 46, 37, 60, 62, 63, 84; 241/282.1; 426/443, 478, 601; 366/234, 601

[56] References Cited

U.S. PATENT DOCUMENTS

| | | | |
|---|---|---|---|
| 3,885,321 | 5/1975 | Fouineteau | 210/360.1 |
| 4,114,286 | 9/1978 | Bingham | 99/495 |
| 4,209,916 | 7/1980 | Doyel | 34/58 |
| 5,054,209 | 10/1991 | Koff | 494/60 X |

OTHER PUBLICATIONS

P. 85 of Rowoco catalog, circa 1990.
P. 7 of 1993 Rowoco catalog, date unknown.

*Primary Examiner*—Timothy F. Simone
*Attorney, Agent, or Firm*—Rockey, Rifkin & Ryther

[57] ABSTRACT

A salad spinner comprising a bowl, a colander adapted to nest within the bowl, and a lid for the bowl and colander. Drive means are associated with the lid for rotating the colander relative to the bowl. The drive means include a handle having one end for manual engagement with the opposite end of the handle being pivotably mounted to the lid. A drive gear is positioned at the opposite end of the handle, and a turret is positioned on the underside of the lid. The turret is rotatably attached to the lid and a pinion gear is provided in driving engagement with the turret. This pinion gear meshes with the drive gear whereby movement of the handle transmits movement to the turret through the pinion gear. Drive tabs are carried by the turret for engaging the colander to impart spinning movement to the colander in response to movement of the handle.

8 Claims, 5 Drawing Sheets

5,562,025

SALAD SPINNER APPARATUS

BACKGROUND OF THE INVENTION

This invention relates to an apparatus useful in the making of salads. In particular, the invention comprises an apparatus known as a salad spinner although parts of the apparatus have separate utility as a colander and as a serving bowl.

Salad spinners in the prior art typically consist of an outer bowl with solid walls, and an inner perforated bowl adapted to nest within the outer bowl. Salad ingredients are located in the inner bowl, and a cover is provided for covering the salad. A drive means is provided for spinning the inner bowl relative to the outer bowl whereby water on the lettuce and/or other vegetables can be passed through the perforated wall and collected in the outer bowl. A handle for operating the drive means is often associated with a lid placed over the bowls.

SUMMARY OF THE INVENTION

This invention comprises a salad spinner apparatus of the type including an outer bowl with solid walls, and an inner perforated bowl nested within the outer bowl. A lid is provided for covering the outer bowl and the lid includes drive means for spinning the inner bowl relative to the outer bowl.

The drive means specifically comprises clutch means for spinning the inner bowl in one direction. These means include a handle positioned adjacent the periphery of the lid. A drive arm extends from the handle to a pivotal connection adjacent the opposite side of the lid.

A gear or gear segment is moved about the axis of the pivotal connection of the drive arm and a pinion is engaged with the gear teeth. This pinion is tied to a turret member which is positioned on the bottom side of the lid, and which provides a closure for the drive mechanisms supported by the lid.

The turret defines drive elements at its outer periphery. When the lid is put into place, these drive elements are automatically placed in position for driving engagement with the inner perforated bowl. Accordingly, once the lid is in place, operation of the handle imparts driving movement to the inner bowl to achieve a highly effective spinning operation. Because of the clutch drive, the spinning movement may be repeated as often as desired.

Particularly because the turret serves as a closure for the underside of the lid, a very reliable drive mechanism is provided. Thus, moisture and salad particles are blocked from entering the area of the drive mechanisms and will not tend to clog or corrode these mechanisms. The efficiency of the system is further enhanced by the fact that the perforated inner bowl can be used as a colander while the outer bowl can be used as a serving bowl for the salad or for other similar purposes.

DETAILED DESCRIPTION OF THE INVENTION

Figure 1:
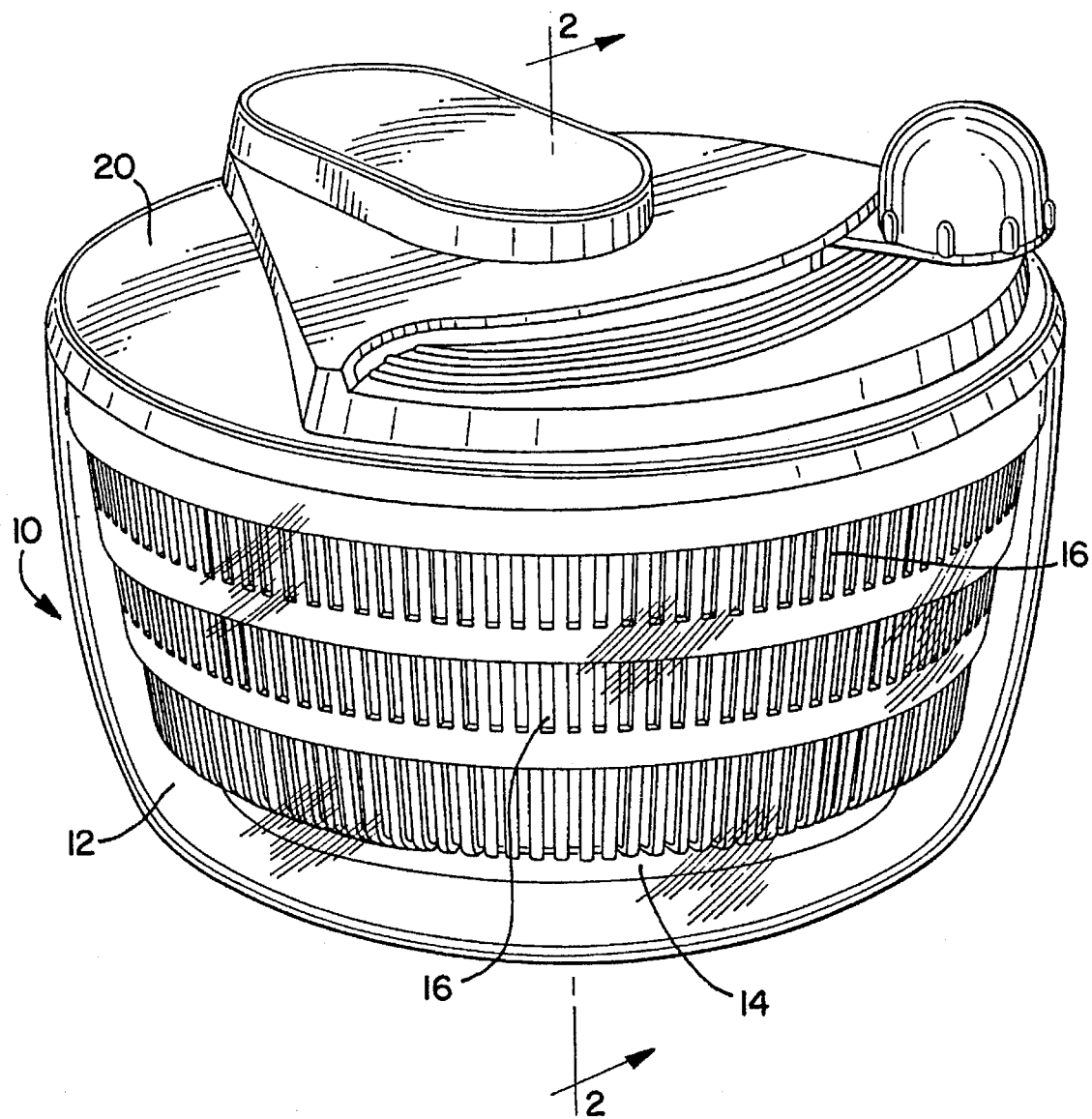
FIG. 1 is a perspective view of one form of salad spinner characterized by the features of the invention.
Figure 4:
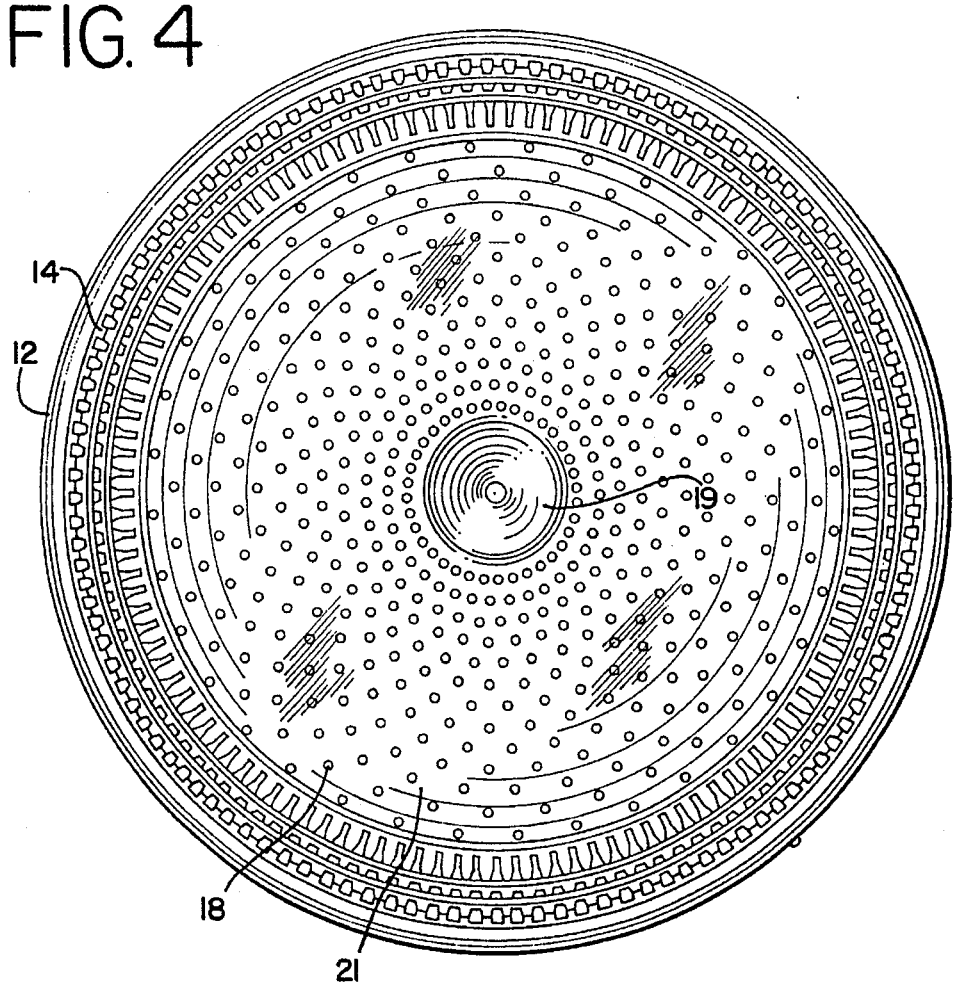
FIG. 4 is a bottom view of the salad spinner of FIG. 1.
Figure 5:
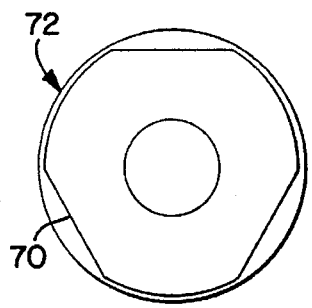
FIG. 5 is a top plan view of a type of ratchet useful for the drive means of the invention.

FIG. 1 illustrates a salad spinner 10 which includes a transparent bowl 12 and a colander 14. The bowl 12 has a solid wall construction while a plurality of perforations 16 are defined by the side walls of the colander with additional perforations 18 being defined by the bottom wall of the colander (FIG. 4).

A protrusion 19 extends upwardly from the bottom wall surface 21 of the bowl 12. A correspondingly shaped recess 23 is defined by the bottom wall 27 of colander 14 so that these elements interfit while permitting rotational movement of the colander relative to the bowl.

Figure 2:
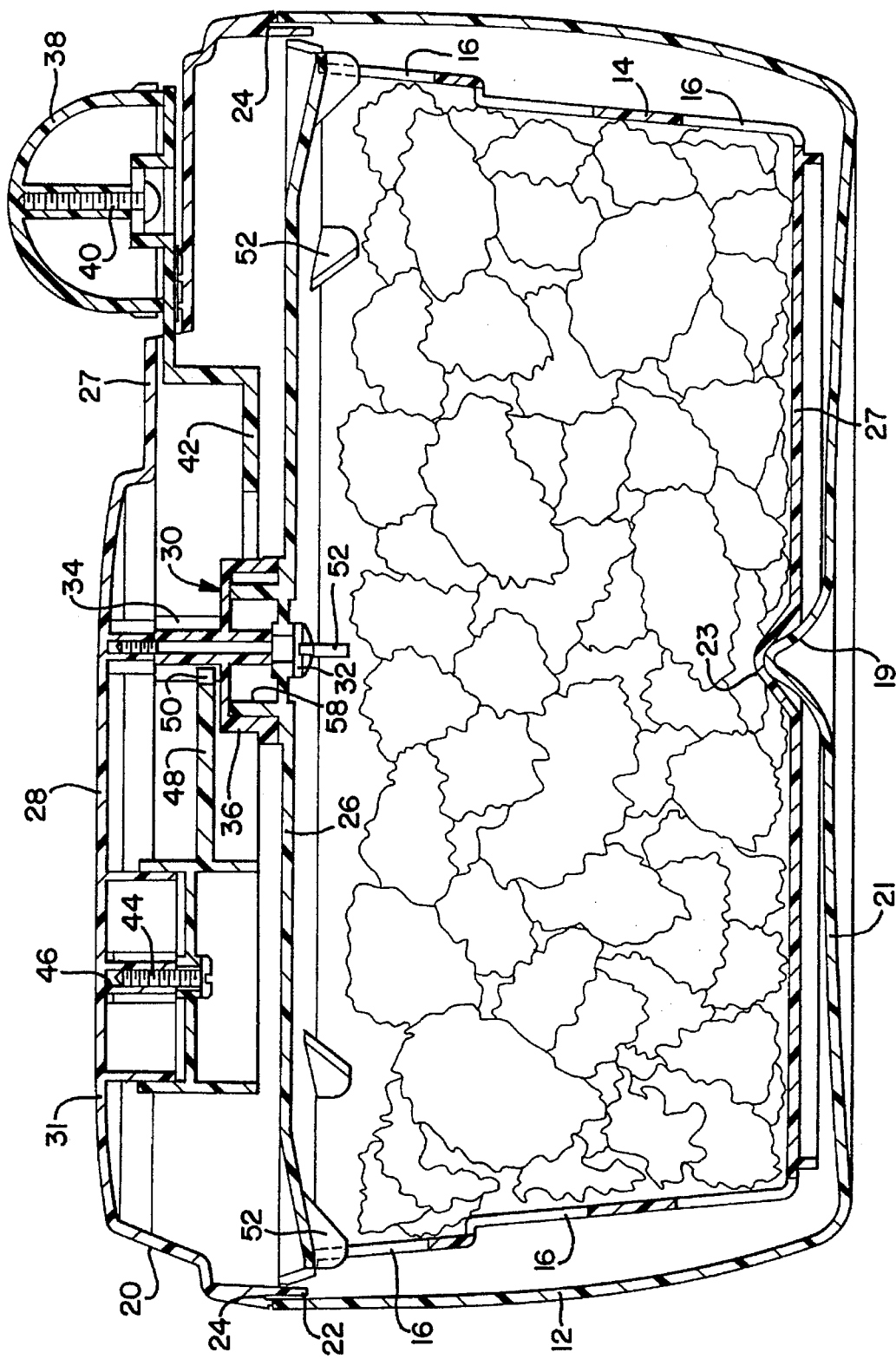
FIG. 2 is a vertical elevational cross-sectional view of the salad spinner of FIG. 1.

A lid 20 is adapted for interfitting relationship with the bowl 12. As best shown in FIG. 2, this lid includes a downwardly extending flange 22 spaced inwardly of shoulder 24. The flange fits within the confines of the bowl while the shoulder is adapted to rest on the top edge 25 of the bowl.

A turret 26 extends crosswise of the lid in spaced relationship with the top wall 28 of the lid. The turret supports a ratchet 30 which is positioned for rotation about pin 32. This pin includes threaded end 33 which permits attachment to top wall 28 whereby the pin holds the turret in assembly with the top wall while permitting rotation of the turret along with ratchet 30.

Figure 3:
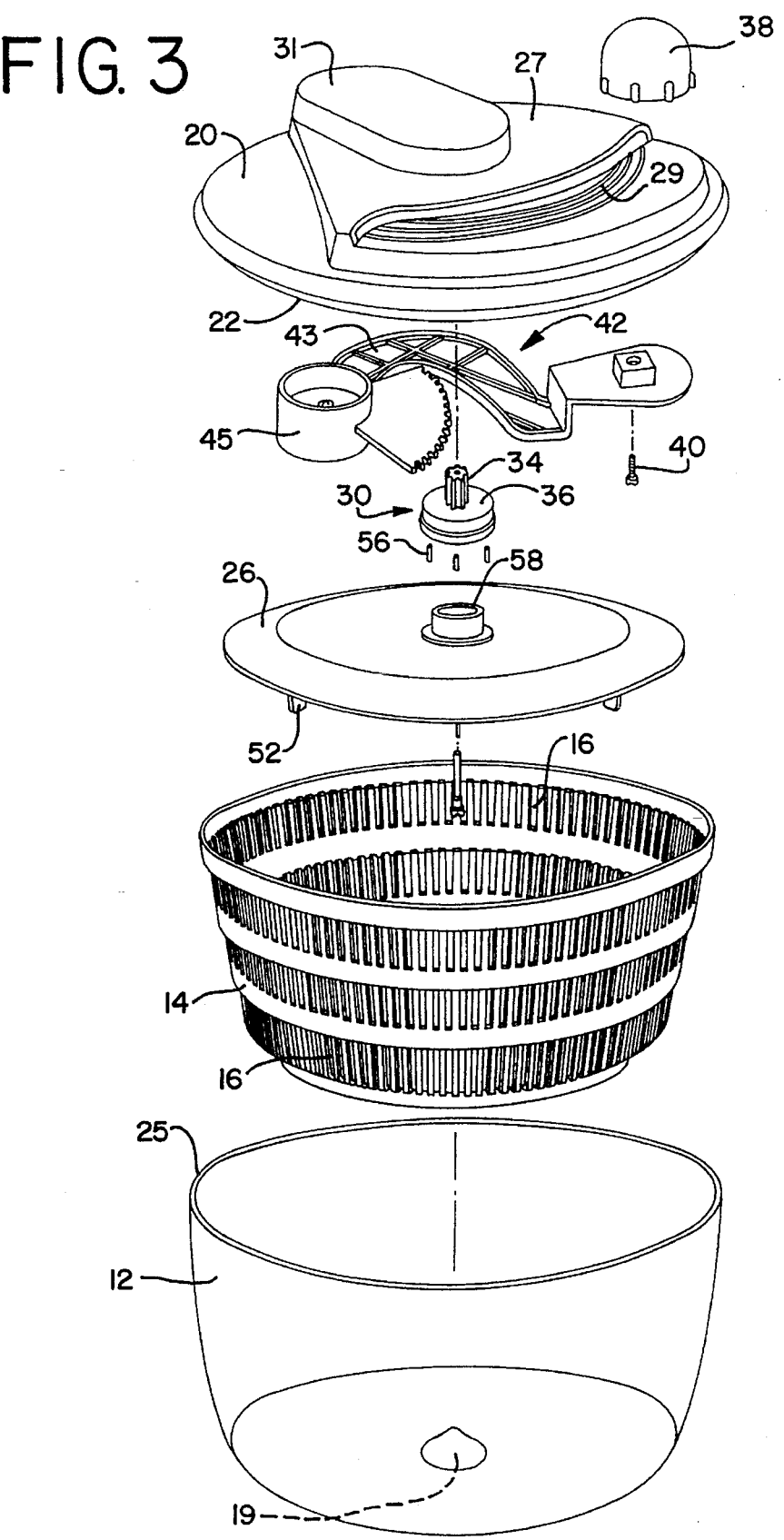
FIG. 3 is an exploded view of the salad spinner of FIG. 1.

As best shown in FIG. 3, the ratchet 30 includes pinion gear teeth 34 which extend upwardly from the larger diameter body portion 36 of the ratchet. A clutch drive connection, to be described in greater detail, is formed between this ratchet body portion and the turret 26.

As illustrated in the drawings, a knob 38 is attached by means of fastener 40 to handle 42. The handle includes central curved section 43 to provide clearance for movement, and the opposite end 45 of the handle defines a central opening which freely receives fastener 44. This fastener is secured in threaded opening 46 defined inwardly of the top wall 28 of the lid. With the fastener in place, the handle 42 is held in attachment with the lid, however, the end of the handle is pivotable about the fastener 44.

The top wall 28 includes a horizontal raised section 27 which is spaced upwardly from the side portions of the lid. Opening 29 is defined by the section 27 for receiving the handle. The lateral extent of this opening defines the desired amount of pivotal movement of the handle for suitable spinning action. A second horizontal raised section 31 serves as a hand grip to facilitate the handle movement.

The handle 42 includes an integrally formed gear segment 48. The teeth 50 of the segment are engaged with the pinion gear teeth 34.

The turret 26 defines a plurality of drive tabs 52. As best shown in FIG. 2, when the lid 20 is placed over the bowl and colander, these drive tabs fit within upper ones of the perforations 16 defined by the colander. Accordingly, rotation of the turret 26 will automatically result in spinning of the colander relative to the bowl 12.

Figure 6:
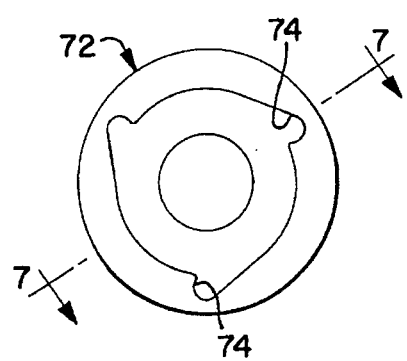
FIG. 6 is a bottom plan view of the ratchet of FIG. 5.
Figure 7:
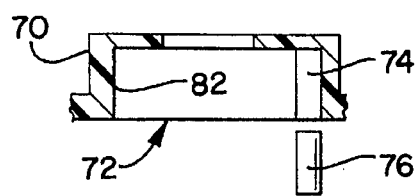
FIG. 7 is a vertical sectional view of the ratchet of FIG. 5.

The particular mechanism for achieving the spinning movement may comprise a clutch arrangement of the type illustrated in FIG. 6. Specifically, the larger diameter body portion 36 of the ratchet 30 defines recessed areas of the type shown at 74 in FIG. 6 for receiving cylindrical pins 56 shown in FIG. 3. The turret defines a centrally located upstanding wall 58 which engages the pins to thereby provide the driving connection between the ratchet 30 and the turret.

Figure 8:
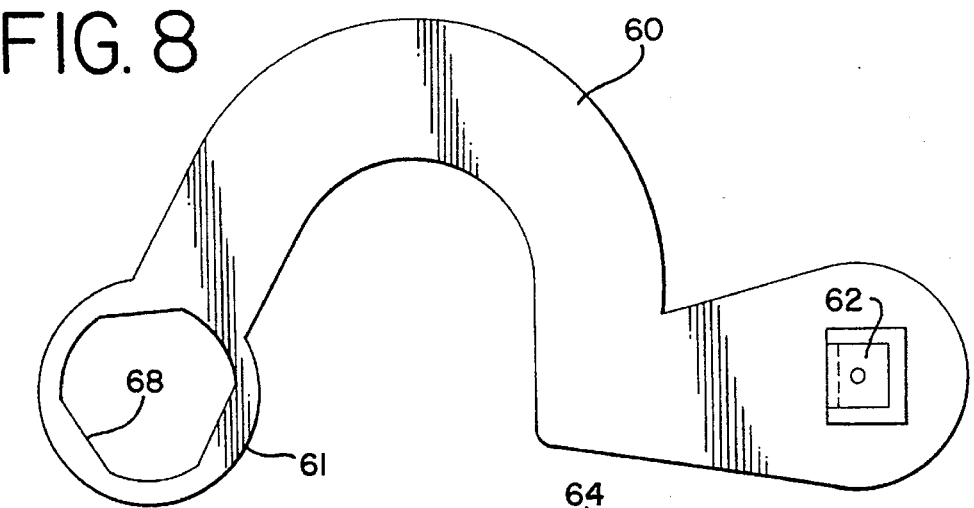
FIG. 8 is a plan view of an alternative form of handle useful for the drive means of the invention.
Figure 9:
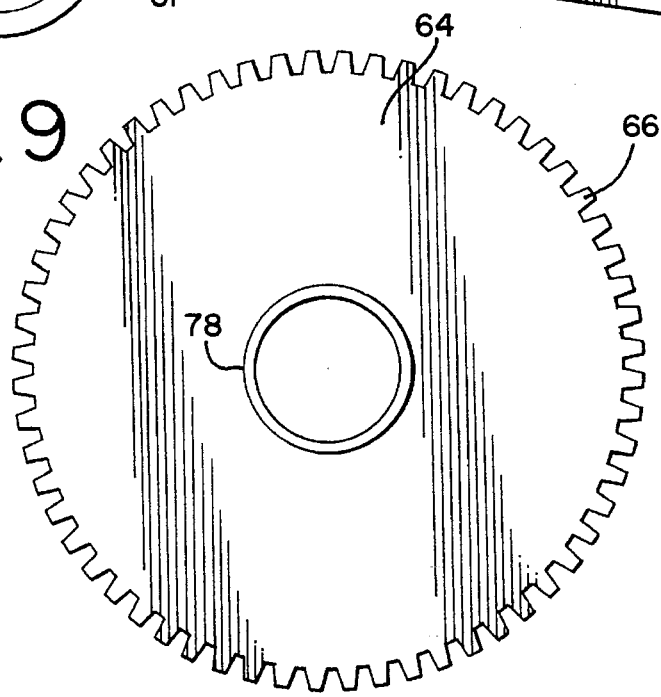
FIG. 9 is a plan view of an alternative form of large gear useful for the drive means of the invention.
Figure 10:
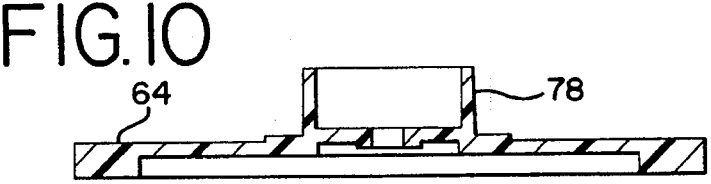
FIG. 10 is a side elevational view of the gear of FIG. 8.

The drive components illustrated in FIGS. 1 through 6 may all comprise plastic components of conventional types such as Acetal or nylon 100. FIGS. 5–11 illustrate an alternative form of the invention wherein the drive handle 60 may be of plastic but may also comprise a metal structure as shown in FIG. 8, aluminum being an appropriate material. The handle may consist of a stamped piece having an upwardly bent portion 62 for securing of knob 38. This metal piece may otherwise be completely flat.

The opposite end 61 of the handle 60 is designed for driving engagement with full gear 64 which carries teeth 66. Specifically, the end 61 defines an opening 68 which is shaped to receive the top side 70 of ratchet 72. The interior 82 of this ratchet defines recessed areas 74 adapted to receive pins 76.

The gear 64 is formed with an outwardly protruding circular wall 78 dimensioned for receipt within the interior 82 of ratchet 72. The pins 76 thereby provide a driving connection between the ratchet and gear and, since the ratchet is attached to handle 60, pivoting of the handle results in rotation of the gear.

Figure 11:
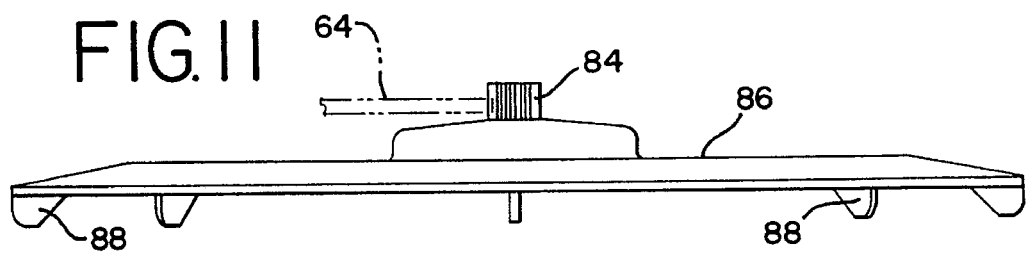
FIG. 11 is a side elevational view of an alternative form of turret useful for the drive means of the invention.

The gear 64 is drivingly engaged with pinion 84 of the turret 86 as shown in FIG. 11. Since this turret has drive tabs 88 of the type described with respect to the other embodiment of the invention, this combination also results in spinning of a colander in the manner described.

The respective embodiments of the invention may be used in combination with a bowl of any conventional size, for example, in the order of 10 inches in diameter. A gear ratio in the order of 10.0 to 1.0 is effective for achieving spinning sufficient for effective water removal. The lever arm drive arrangements described are particularly efficient from the standpoint of achieving these results with minimum effort while being suitably economical from manufacturing and maintenance points of view.

It will be understood that various changes and modifications may be made in the above-described structure without departing from the spirit of the invention particularly as defined in the following claims.

That which is claimed is:

1. A salad spinner comprising a bowl, a colander adapted to nest within said bowl, the vertical axes of said bowl and said colander being in alignment, a lid for said bowl and colander, and drive means associated with said lid and operatively connected to said colander for rotating said colander about its axis relative to said bowl, said drive means including a handle having one end for manual engagement, the opposite end of said handle being pivotably mounted to said lid, said one end and said opposite end being positioned on opposite sides of said axes, a drive gear positioned at said opposite end of the handle, a turret positioned on the underside of said lid, means rotatably attaching said turret to said lid, a pinion gear in driving engagement with said turret, said pinion gear meshing with said drive gear whereby movement of said handle in one direction from a starting position transmits movement to said turret through said pinion gear, and including means carried by said turret for engaging said colander to impart spinning movement to the colander in response to movement of said handle in said one direction, clutch means operatively connected to said handle, said clutch means permitting return of the handle to said starting position to thereby permit repeat movement of the handle for repeating said spinning movement.

2. A salad spinner according to claim 1 including a clutch drive interconnecting said pinion gear and said turret.

3. A salad spinner according to claim 1 including a clutch drive interconnecting said handle and said drive gear.

4. A salad spinner according to claim 1 wherein said turret underlies substantially the entire lid and thereby serves as a closure for the underside of said lid, and drive tabs located at the periphery of said turret, location of said lid over said bowls and colander automatically bringing said drive tabs into engagement with said colander.

5. A salad spinner according to claim 4 wherein said colander is perforated, said drive tabs fitting within perforations to achieve said engagement with said colander.

6. A salad spinner according to claim 1 wherein said handle defines a curved central section permitting pivoting movement of the handle.

7. A salad spinner according to claim 1 wherein said lid defines a horizontal raised section defining a laterally extending opening, said handle being movable back and forth within said opening.

8. A salad spinner according to claim 7 wherein said lid defines a second raised section serving as a hand grip.

\* \* \* \* \*